July 7, 1964

D. L. GARDNER 3,139,873

EXHAUST AND WATER INJECTOR FOR INTERNAL COMBUSTION ENGINES

Filed March 19, 1963

Donald L. Gardner
INVENTOR.

July 7, 1964     D. L. GARDNER     3,139,873
EXHAUST AND WATER INJECTOR FOR INTERNAL COMBUSTION ENGINES
Filed March 19, 1963     2 Sheets-Sheet 2
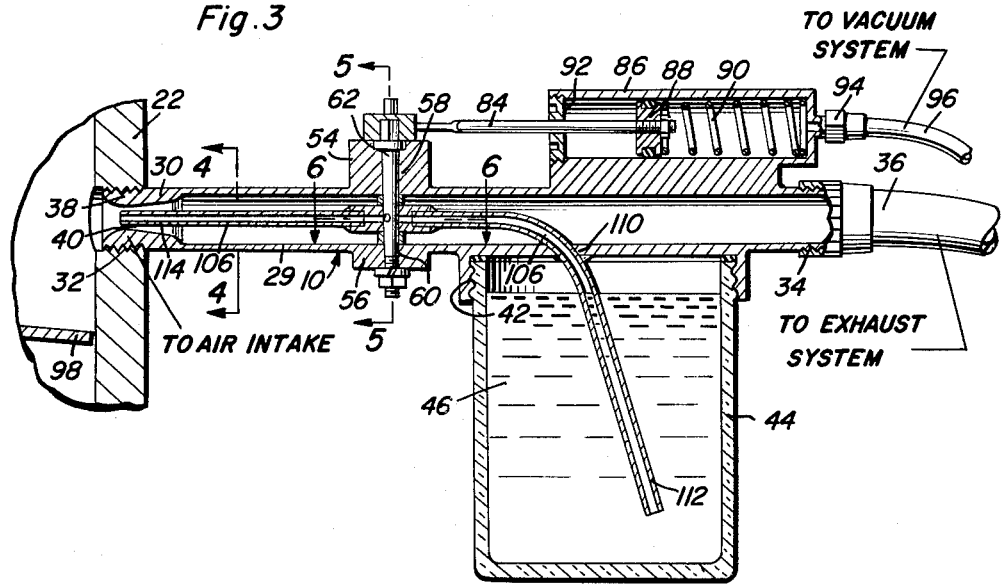
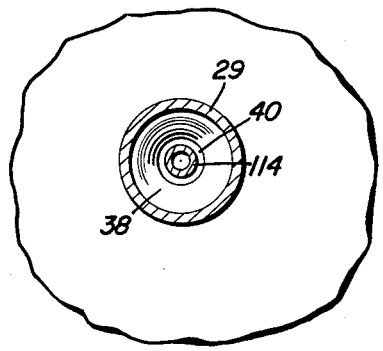
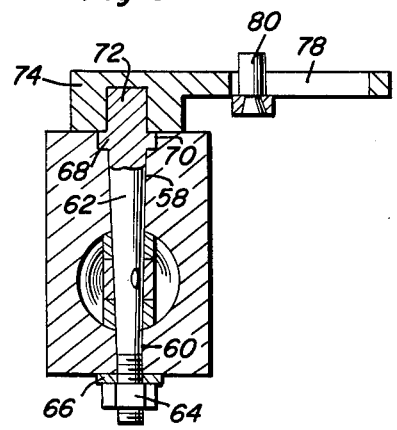
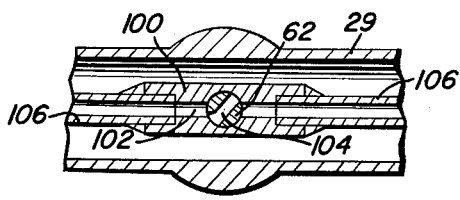
Donald L. Gardner
INVENTOR.

United States Patent Office 3,139,873
Patented July 7, 1964

3,139,873
EXHAUST AND WATER INJECTOR FOR INTERNAL COMBUSTION ENGINES
Donald L. Gardner, Box 1365, Prescott, Ariz.
Filed Mar. 19, 1963, Ser. No. 266,351
7 Claims. (Cl. 123—119)

This invention comprises a novel and useful exhaust and water injector for an internal combustion engine and more particularly pertains to a device for beneficially effecting the operation of a conventional internal combustion engine by the controlled injection of exhaust gases and water into the air intake of the engine prior to the passage of the air through the carburetor.

For numerous reasons which need not be here discussed it has been found beneficial to the operation of internal combustion engines particularly with regard to the fuel economy thereof to introduce into the carburetor and the combustible mixture which is applied to the cylinders of the engine through the intake manifold system thereof, controlled quantities of exhaust gases and water. In order to obtain the optimum beneficial effects from the injections of such fluids into the engine manifold system, it is obvious that a great precision of control of the quantity of fluids injected as well as an intimate mixing of such fluids with the other constituents of the combustible mixture is essential. It is also a known fact that the quantity of the injected fluids must be precisely controlled and varied in accordance with the varying conditions of operation of an internal combustion engine as for example variations in the speed, manifold suction and other characteristics of the engine.

It is therefore the primary purpose of this invention to provide a device which will enable a precisely controlled injection of exhaust gases and water into the intake system of internal combustion engines.

A further object of the invention is to provide a device in accordance with the foregoing object wherein variations of the vacuum or intake pressure of the intake manifold system of the engine may be utilized as the agent and the means for proportioning the rate of injection of water into the engine manifold system.

A further object of the invention is to provide an injecting device in accordance with the foregoing objects wherein the velocity of flow of a stream of exhaust gases is utilized to effect the introduction of water into the intake manifold system of an engine.

Still another object of the invention is to provide a device in accordance with the preceding objects in which water is aspirated into a venturi by the flow of exhaust gases therethrough, is mixed with the exhaust gases and with the exhaust gases is injected into the air intake of an engine carburetor.

Still a further object of the invention is to provide a device in accordance with the preceding objects which shall be of simple and compact construction, and whereby a single conduit mounted upon the air intake of an internal combustion engine supports a source of water, a water control valve, a venturi and water nozzle mixing assembly, and a control means for the water valve.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2:
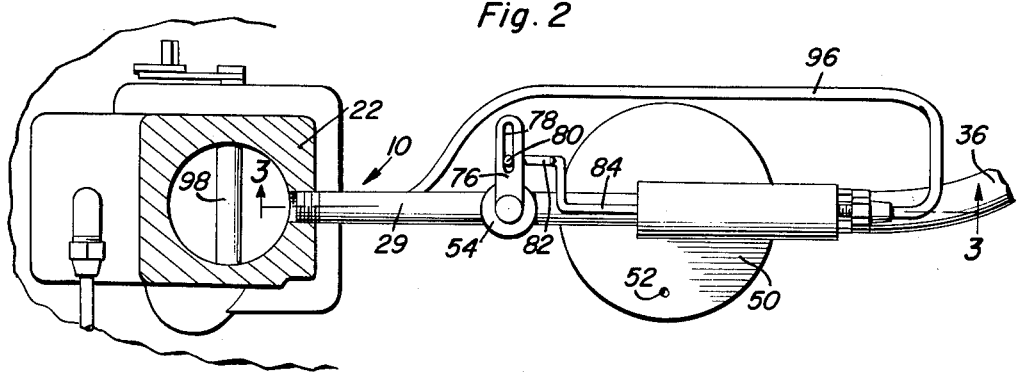
FIGURE 2 is a view taken in horizontal section substantially upon the plane indicated by the section line 2—2 of FIGURE 1 and upon an enlarged scale, parts being broken away and other parts being shown in elevation.

FIGURE 3 is a view in vertical longitudinal section taken upon an enlarged scale and substantially upon the plane indicated by the section line 3—3 of FIGURE 2; and FIGURES 4, 5 and 6 are detail views taken respectively upon the plane indicated by the section line 4—4, 5—5 and 6—6 of FIGURE 3.

Figure 1:
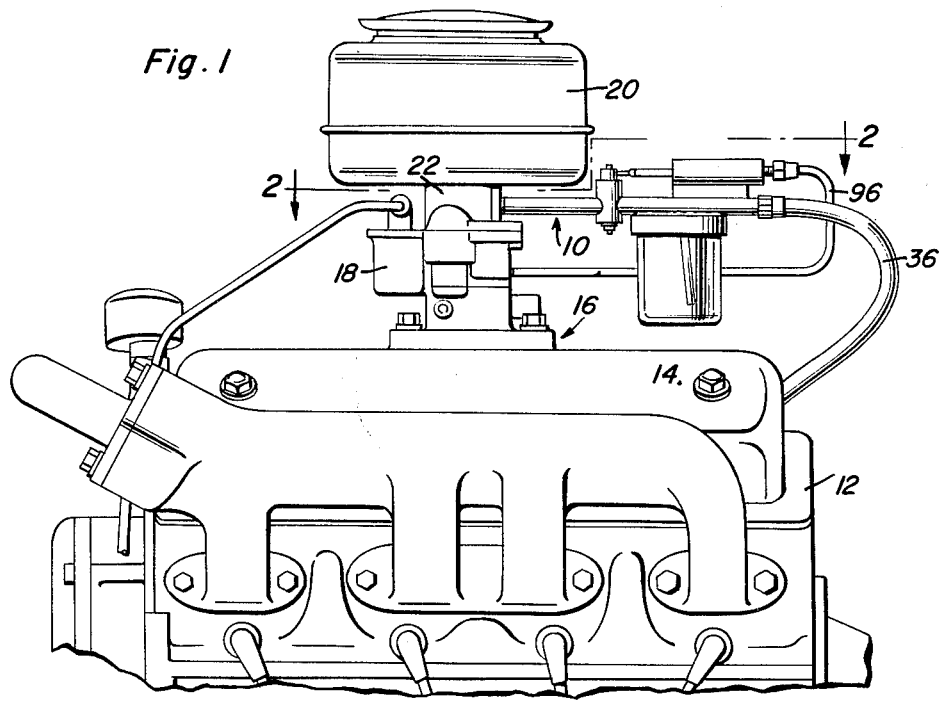
FIGURE 1 is a side elevational view of a portion of an internal combustion engine showing the intake manifold system and exhaust pipe thereof and the manner in which an exhaust gas and water injector in accordance with this invention is operatively connected therewith.

Referring first to FIGURE 1 of the accompanying drawings, the numeral 10 designates generally the exhaust gas and water injector in accordance with this invention which is shown as operatively connected with an internal combustion engine 12, the latter having an exhaust pipe or exhaust manifold 14, an intake manifold system designated generally by the numeral 16 which includes a carburetor 18, an air cleaner 20 and a carburetor air inlet pipe 22. It is with these elements of a conventional internal combustion engine that the injecting device of this invention is particularly concerned.

Referring now specifically to FIGURE 3, it will be observed that the injecting device 10 preferably comprises a rigid conduit or hollow body 29 having one extremity 32 externally threaded for engagement in the wall of the intake pipe 22 of the intake manifold assembly of the engine. The other end of this pipe is preferably externally threaded as at 34 for engagement by a conduit or pipe 36, see FIGURE 1, which communicates with the exhaust pipe or exhaust manifold 14 at any suitable point for receiving exhaust gases therefrom. At the outlet end of the conduit 29 there is formed a venturi 38. This venturi may comprise either an integral appropriately formed portion upon the interior of the conduit 29 or may comprise a separate venturi element inserted thereinto. In any event, the venturi 38 includes a throat 40 through which the exhaust gases delivered by the exhaust gas supply conduit 36 may continuously flow into the air intake pipe 22 of the intake manifold system.

Intermediate its ends the conduit 29 is provided with a depending circular internally threaded flange 42 which is adapted to removably receive and retain the upper externally threaded end of a water container or reservoir 44 which may conveniently be of a transparent material. A supply of water as indicated at 46 is retained in this container, this being replenished from time to time as may be necessary. The lower portion of the conduit 29 is enlarged to provide a circular top wall 50 constituting a closure for the water reservoir 44. A suitable vent opening as at 52 is provided in this top wall in order to communicate the interior of the reservoir with the atmosphere and thus avoid a dash pot effect therein.

Between the water reservoir 44 and the venturi 38, the conduit 29 is provided with vertical enlargements 54 and 56 at its upper and lower surfaces. These enlargements are provided with aligned vertical bores as at 58 and 60 therethrough through which extends a vertically elongated valve body 62.

Referring especially to FIGURE 5 it will be noted that the valve body at its extending lower end is provided with a nut 64 and a washer 66 and that the body is slightly conical or tapered while being provided with a diametrically enlarged collar or flange 68 at its upper portion which is received in a counterbore 70 in the bore 58. Thus, by tightening the nut 64, the valve body may be drawn downwardly in its registering bores and caused to establish a fluid-tight fit therewith while being rotatable therethrough.

The upper extremity of the valve body is provided with a non-circular upper portion 72 upon which is engaged the socketed end 74 of a valve operating lever 76. The latter is provided with a slot 78 therein in which is engaged a pin-like fastener 80 provided upon the end portion 82 of the offset end of a piston rod 84. As shown best in FIGURE 3, this piston rod extends into an operating means for the control valve which operating means comprises a cylinder and piston unit. The cylinder 86 is preferably integrally formed upon the top surface of the conduit 29 adjacent its inlet end. Alternatively, however, the cylinder may be separately formed and detachably secured upon the conduit.

Slidable in the cylinder is a piston 88 to which the piston rod 84 is connected, the piston being spring-urged as at 90 toward the left end of the cylinder. A removable closure plug 92 is provided for the left end of the cylinder and constitutes a closure for retaining the piston in the cylinder as well as a guide for the piston rod.

At the right end of the cylinder there is connected as by a coupling 94 a suction line 96 which as shown in FIGURES 1 and 2 is placed in communication with the interior of the air intake manifold between the throttle valve 98 thereof and the engine intake manifold.

At its central portion, that is within the confines of the conduit 29, the valve body 62, see FIGURE 6, is rotatably received within a body member 100 having a passage 102 extending therethrough. The valve body itself has a passage 104 which is selectively registrable to varying degrees with the passage 102 during selected rotation of the valve body. Connected to the opposite ends of the member 100 and communicating with the passage 102 therethrough are the pipe sections 106 and 108, respectively. The pipe section 106 passes downwardly through a suitable opening 110 of the top or cover 50 into the water reservoir 44 and has its adit or inlet 112 disposed adjacent the bottom of the reservoir for the intake of water therefrom. The section 108 has its extremity 114 disposed within and terminating closely adjacent to the throat portion 40 of the venturi element 38 and disposed centrally thereof.

The operation of the device is as follows:

Exhaust gases continuously flow from the exhaust pipe through the conduit 36, the conduit 29 and the venturi 30 into the air intake pipe 28 where they mingle with the incoming air to the carburetor. The flow of exhaust gases may be regulated in any desired manner. For instance, the precise spacing or opening of the venturi and the space between the latter and the water discharge nozzle 114 may be of such magnitude as to effectively needle or throttle this rate of flow. On the other hand, a control valve, not shown, of any suitable character may be provided between the exhaust manifold and the conduit 36. In any event, it is intended that a suitable rate of flow of exhaust gases shall be provided through the conduit 29 and venturi 38 into the air intake pipe 22. The flow of these exhaust gases at the throat of the venturi has an aspirating effect upon the nozzle 114 thus drawing water from the reservoir 44 into exhaust gas stream where the water is mingled with the latter and the mingled exhaust gases and the water are in turn introduced and injected into the air flow through the air intake pipe 22.

The rate of flow of water in proportion to the flow of exhaust gases is controlled by the control valve 62, being varied from zero to a maximum. The control valve itself is preferably automatically controlled and regulated in response to variations in the pressure of vacuum in the intake manifold system by means of a cylinder piston unit and the connection of the latter by the piston rod 84 and valve lever 76 on the control valve.

It will thus be appreciated that an automatically controlled injection of water mixed with exhaust gases is introduced into the air intake pipe of the charge forming system of the internal combustion engine.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with an internal combustion engine having a carburetor with an air intake, an intake manifold and an exhaust pipe, a water injecting device comprising a venturi connected to said air intake, a water discharge nozzle having its outlet in said venturi, means for discharging exhaust gases from said exhaust pipe into said venturi and across said water discharge nozzle outlet, means for supplying water to said water discharge nozzle, a control valve in said water supply means controlling the rate of flow of water, operating means for said control valve actuated by vacuum variations in said intake manifold.

2. The combination of claim 1 wherein said operating means includes a cylinder and piston unit connected to said intake manifold, a control lever on said control valve connected to said unit.

3. The combination of claim 1 wherein said water supply means includes a water reservoir which is vented to the atmosphere.

4. The combination of claim 1 including a conduit connected to and communicating with said air intake, said venturi being disposed in said conduit and said exhaust gas discharge means being connected to said conduit.

5. The combination of claim 4 wherein said water supply means includes a water reservoir carried by said conduit and a tube communicating with said reservoir and with said water discharge nozzle.

6. The combination of claim 5 wherein said control valve is disposed in said conduit and said control valve operating means is mounted upon said conduit.

7. The combination of claim 6 wherein said control valve comprises a valve body disposed in said conduit, a rotatable valve member journaled in said valve body and having opposite ends rotatably mounted in said conduit, said water supply means including a passage through said valve body controlled by said valve member.

References Cited in the file of this patent

UNITED STATES PATENTS

| | | |
|---|---|---|
| 1,328,844 | Oberreich | Jan. 27, 1920 |
| 1,532,638 | Rodgers | Apr. 7, 1925 |
| 1,594,616 | Hifferman | Aug. 3, 1926 |
| 1,889,584 | Zimmerer | Nov. 29, 1932 |